United States Patent [19]

Isobe et al.

[11] Patent Number: 5,060,148
[45] Date of Patent: Oct. 22, 1991

[54] CONTROL SYSTEM FOR VECTOR PROCESSOR WITH SERIALIZATION INSTRUCTION FOR MEMORY ACCESSES FOR PIPELINE OPERATION

[75] Inventors: Tadaaki Isobe; Toshiko Isobe, both of Hadano, Japan

[73] Assignees: Hitachi, Ltd., Chiyoda; Hitachi Computer Engineering Co. Ltd., Tokyo, both of Japan

[21] Appl. No.: 121,134

[22] Filed: Nov. 16, 1987

[30] Foreign Application Priority Data

Nov. 18, 1986 [JP] Japan .................. 61-274398

[51] Int. Cl.[5] .................. G06F 15/347; G06F 9/38
[52] U.S. Cl. .................. 364/200; 364/231.8; 364/232.21
[58] Field of Search ... 364/200 MS File, 900 MS File, 364/730, 748, 736

[56] References Cited

U.S. PATENT DOCUMENTS

| | | |
|---|---|---|
| 3,651,482 | 3/1972 | Benson et al. |
| 4,101,960 | 7/1978 | Stokes et al. .................. 364/200 |
| 4,412,303 | 10/1983 | Barnes et al. .................. 364/900 |
| 4,569,034 | 2/1986 | Findley et al. .................. 364/900 |
| 4,617,625 | 10/1986 | Nagashima et al. .................. 364/200 |
| 4,651,274 | 3/1987 | Omoda et al. .................. 364/200 |
| 4,761,753 | 8/1988 | Izumisawa .................. 364/736 |
| 4,789,925 | 12/1988 | Lahti .................. 364/200 |

FOREIGN PATENT DOCUMENTS

| | | |
|---|---|---|
| 0042442 | 12/1981 | European Pat. Off. |
| 0123509 | 10/1984 | European Pat. Off. |
| 0131658 | 1/1985 | European Pat. Off. |
| 219646 | 12/1983 | Japan |
| 59-125472 | 7/1984 | Japan |

OTHER PUBLICATIONS

*Fujitsu Scientific Tech. J.*, Mar. 1985, No. 1, vol. 21, "The Super Computer FACOM VP System", by Tsmura et al., pp. 90-108.

*Primary Examiner*—Lawrence E. Anderson
*Attorney, Agent, or Firm*—Antonelli, Terry, Stout & Kraus

[57] ABSTRACT

An access instruction pipeline for receiving an access instruction for accessing data to be inputted to the pipeline of a vector processor includes a plurality of buffers for buffering a memory request and sending it to a storage control unit, and a detector for judging at the last stage of the plurality of buffers if an instruction is an access instruction or a serialization instruction for serializing the memory access instructions among access instruction pipelines. If a serialization instruction is detected at the last stage of a pipeline, the pipelining operation is stopped, but instructions are filled up in the stopped pipeline. After a serialization instruction has been detected at the last stage of all the pipeline, a pipelining operation starts again.

5 Claims, 5 Drawing Sheets

FIG. 1

FIG. 2  ACCESS INSTRUCTION PROCESSING

FIG. 5A
VECTOR INSTRUCTION SERIES

CONTROL SYSTEM FOR VECTOR PROCESSOR WITH SERIALIZATION INSTRUCTION FOR MEMORY ACCESSES FOR PIPELINE OPERATION

BACKGROUND OF THE INVENTION

The present invention relates to a control system for a vector processor having a plurality of pipelined processing units, and more particularly to a control system suitable for synchronizing or serializing at high speed vector instructions to be processed by the pipelined processing units.

For a vector processor having a plurality of pipelined processing units, it is necessary to synchronized or serialize (hereinafter generally called serializing) vector instructions to be processed at each pipelined processing unit in order to ensure the order of reference to a main storage. Specifically, in a case where a plurality of main storage reference instructions can be executed at the same time, such serialization becomes necessary for execution of succeeding access instructions after completion of advancing access instructions.

As a means for realizing such process, there is known a process as disclosed, e.g., in JP-A-59-125472. According to this publication, a POST flag is provided for each pipelined process stage. When a POST instruction (a kind of serialization instruction) is executed, the POST flag is set at a corresponding process stage where an access instruction is being executed. The POST flag is moved from one stage to another as the processing advances. As another means for serialization, there is known a process as disclosed, e.g., in a publication "HITAC S-810 Processor" at page 60. According to this publication, a VWAC instruction for suspending all the pipelined processing is provided wherein only an access instruction to a main storage is taken into consideration in such a manner that a VWAC instruction is repeatedly executed so as to inhibit execution of succeeding instructions until all the main storage access instructions of advancing instructions before the VWAC instruction have been completed.

Such conventional technique for serialization relies on a concept that succeeding instructions after a serialization instruction are inputted to pipelined processing units only after advancing instructions have been executed fully in the pipelined processing units.

However, the time when serialization of instructions is required actually is at a stage of accessing a main storage, taking an access instruction as an example. At the preceding pipelining stages, it is possible to execute the instructions irrespective of serialization. In other words, in a conventional method of inputting succeeding instructions to pipelined processing units after the advancing instructions have been fully executed, time is wasted on the processings at stages not associated with serialization.

SUMMARY OF THE INVENTION

It is therefore an object of the present invention to provide a control system for a vector processor having a plurality of pipelined processing units and stages wherein instructions can be inputted to and executed at stages before a stage of accessing a main storage.

It is another object of the present invention to provide a serialization control system for a vector processor having a plurality of pipelined processing units wherein an unnecessary idle stage or time is eliminated during execution of a plurality of instructions to be serialized by a serialization instruction for ensuring the order of reference to a main storage, and an excessive inhibition of executing those instructions irrelevant to serialization after a serialization instruction can be avoided.

It is a further object of the present invention to provide a control system for a pipelining vector processor capable of inputting a VWAC instruction (a serialization instruction for an access instruction) before an arithmetic operation instruction to a pipelined processing unit even if a pipelined processing unit dedicated to an access instruction is busy.

According to an aspect of the present invention, there is provided a vector instruction execution control system wherein a serialization instruction in the form of an ordinary vector instruction is inputted to pipelines to be serialized, when the serialization instruction is detected at a specific stage of a pipeline, the pipelining operation of this pipeline is stopped, and when the serialization instruction is detected for all the pipelines to be serialized, the stoppage of each pipelined processing is released. There is further provided a dedicated buffer for loading a serialization instruction issued while performing a pipelined processing, in addition to a register for holding a currently executing instruction.

In the vector instruction execution control system, a serialization instruction is inputted to the pipelined processing units as a vector process instruction. When the serialization instruction is detected at a specific stage of a pipelined processing unit, the pipelining operation of this unit is stopped. A release of stoppage of the pipelining operation is effected when the serialization instruction is detected at the specific stages of all the pipelined processing units to be serialized. In other words, such release is effected at the time when it is detected that the serialization instruction has reached the same stage of each pipelined processing unit. Thus, it becomes possible to ensure that instructions issued before a serialization instruction have passed the specific stage and that instructions issued after the serialization instruction are present before the specific stage. Further, since the vector instruction execution control system becomes free from the serialization processing at the time when the serialization instruction is inputted to the pipelined processing units, it can start executing succeeding instructions without waiting for the end of executing instructions before the serialization instruction. Furthermore, since the serialization instruction is allowed to be detected only at a specific stage of a pipelined processing unit, the pipelining operation continues until such time so that time is not wasted in contrast with the case where the pipelining operation stops at the time when a serialization instruction is inputted to a first stage of a pipelined processing unit.

Further, it becomes possible to issue a serialization instruction to a pipelined processing unit having a currently executing instruction, by the provision of a buffer for a serialization instruction in each pipelined processing unit. A serialization instruction loaded in the buffer is executed (i.e., inputted to the corresponding pipelined processing unit) immediately after the instructions currently executed by the unit have been processed completely.

Consequently, a serialization instruction can be issued to a pipelined processing unit irrespective of whether the unit is now executing advancing instructions or not, without allowing an excessive wait time for succeeding instructions which are not relevant to the serialization instruction. The mnemonic VWAC is an abbreviation of a VECTOR WAIT UNTIL MEMORY ACCESS COMPLETE instruction which is used as an example of a serialization instruction according to this invention. It should be noted that various other mnemonic codes may be used instead.

DESCRIPTION OF THE PREFERRED EMBODIMENT

A preferred embodiment of the present invention will be described with reference to the accompanying drawings.

Figure 1:
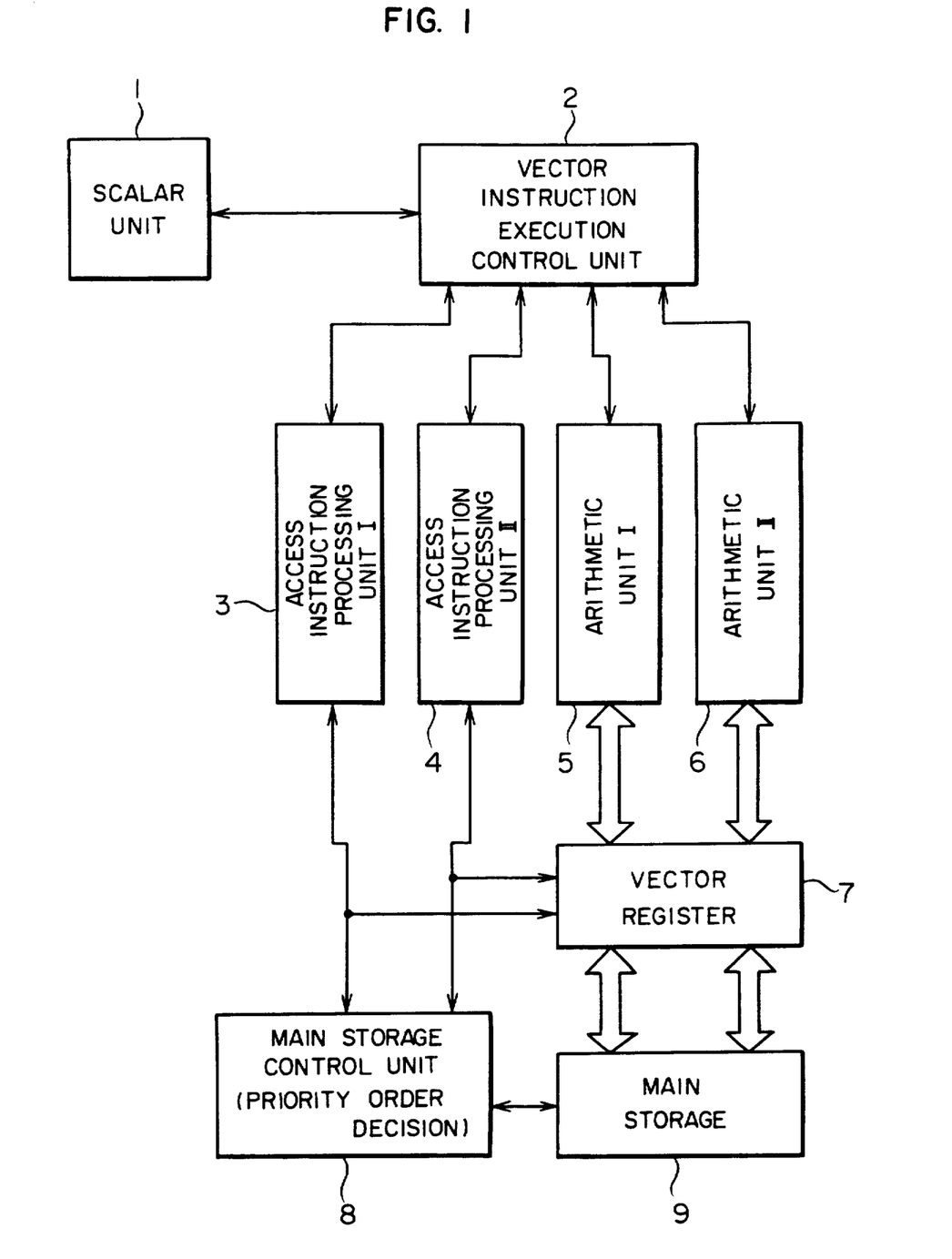
FIG. 1 is a schematic block diagram showing an example of the structure of a vector processor.

The entire structure of a vector processor embodying the present invention is shown in FIG. 1. In the Figure, the vector processor comprises a scalar processing unit 1, a vector instruction execution control unit 2, access instruction processing units 3 and 4, arithmetic operation units 5 and 6, a vector register 7, a main storage control unit 8 and a main storage 9. The access instruction processing units 3 and 4 and the arithmetic operation units 5 and 6 each constitute a pipelined processing unit or a pipeline.

A vector instruction sent from the scalar processing unit 1, which may be a well-known central processing unit, is decoded by the vector instruction execution unit 2 to activate idle pipelined processing units 3 to 6. The access instruction processing units 3 and 4 control data transfer between the vector register 7 and the main storage 9. The vector register 7 stores various vector data. The main storage control unit 8 accesses the main storage 9 in accordance with an access request received from the access instruction processing units 3 and 4.

Figure 2:
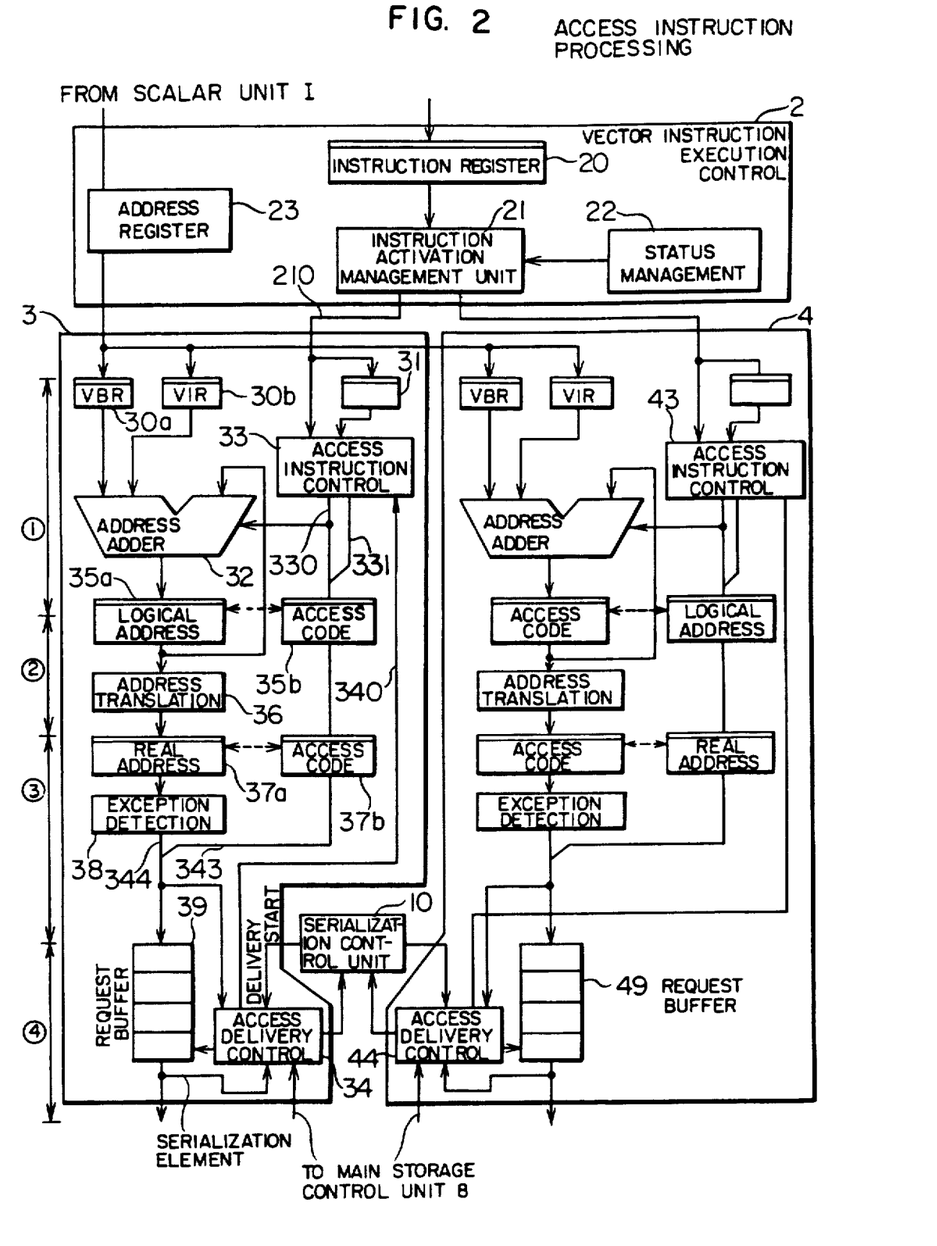
FIG. 2 is a block diagram showing an example of an access instruction processing unit.

FIG. 2 shows an example of the structure of the access instruction processing units 3 and 4. Each of the access instruction processing units 3 and 4 is divided into four stages: (1) an address calculation stage, (2) an address translation stage, (3) an exception detection stage, and (4) a request delivery stage. Although the following description is directed to the access instruction processing unit 3, it is to be noted that the description is also applicable to the access instruction processing unit 4.

Referring to FIG. 2, a base address register VBR 30a holds a base value of an address of an access instruction sent from the vector instruction execution control unit 2, and an increment address register VIR 30b holds an increment value used for obtaining an address of each vector element. The start address of a vector element corresponding to an access instruction is loaded in the VBR 30a and set in an address register 35a. The second and succeeding addresses are sequentially generated through addition of the contents of the address register 35a and the VIR 30b. An address translation unit 36 translates a logical address of a vector element loaded in the register 35a into a real address, the address translation unit being realized by a hardware such as a translation table storing pairs of logical and real addresses. A register 37a stores a real address translated from a logical address. An exception detection unit 38 detects an addressing exception and a storage protection exception for a translated address. An access instruction from which an exception has been detected is affixed with a flag corresponding to the instruction and such effect is indicated to the main storage control unit 8. A request buffer 39 constructed of a plurality of registers stores access addresses corresponding to access instructions passed through a portion of the exception detection operation and serves to absorb a request processing disturbance caused by contention of a request for accessing the main storage 9 from the other access request delivery control unit. An access request delivery control unit 34 controls the delivery of requests in the request buffer 39 to the main storage control unit 9, and when it detects a serialization element at the output port of the request buffer 39, it notifies a serialization unit 10 of such effect and stops the delivery (indicated by 341 in FIG. 4) of succeeding requests to the main storage control unit 8. The main storage control unit 8 can notify the vector instruction execution control unit 2 of a detected exception.

When the serialization control unit 10 receives a notice from both the access delivery control units 34 and 44 of the access instruction processing units 3 and 4 that they have detected a serialization element (performed a serialization), the serialization control unit 10 instructs the units 34 and 44 to start again the delivery of requests.

An access instruction control unit 33 holds an instruction sent from the vector instruction execution control unit 2 and judges the status of processing access requests in the access instruction processing unit to thereby output a signal 330 for instructing an address adder 32 to perform a calculation and requesting an access to the access request register 35b. A serialization instruction buffer 31 allows the vector instruction execution control unit 2 to issue a serialization instruction even when the access instruction control unit 33 is executing another vector instruction, and holds the issued serialization instruction. Registers 35b and 37b corresponding to the address registers 35a and 37a store codes representative of the type of access request.

Figure 3:
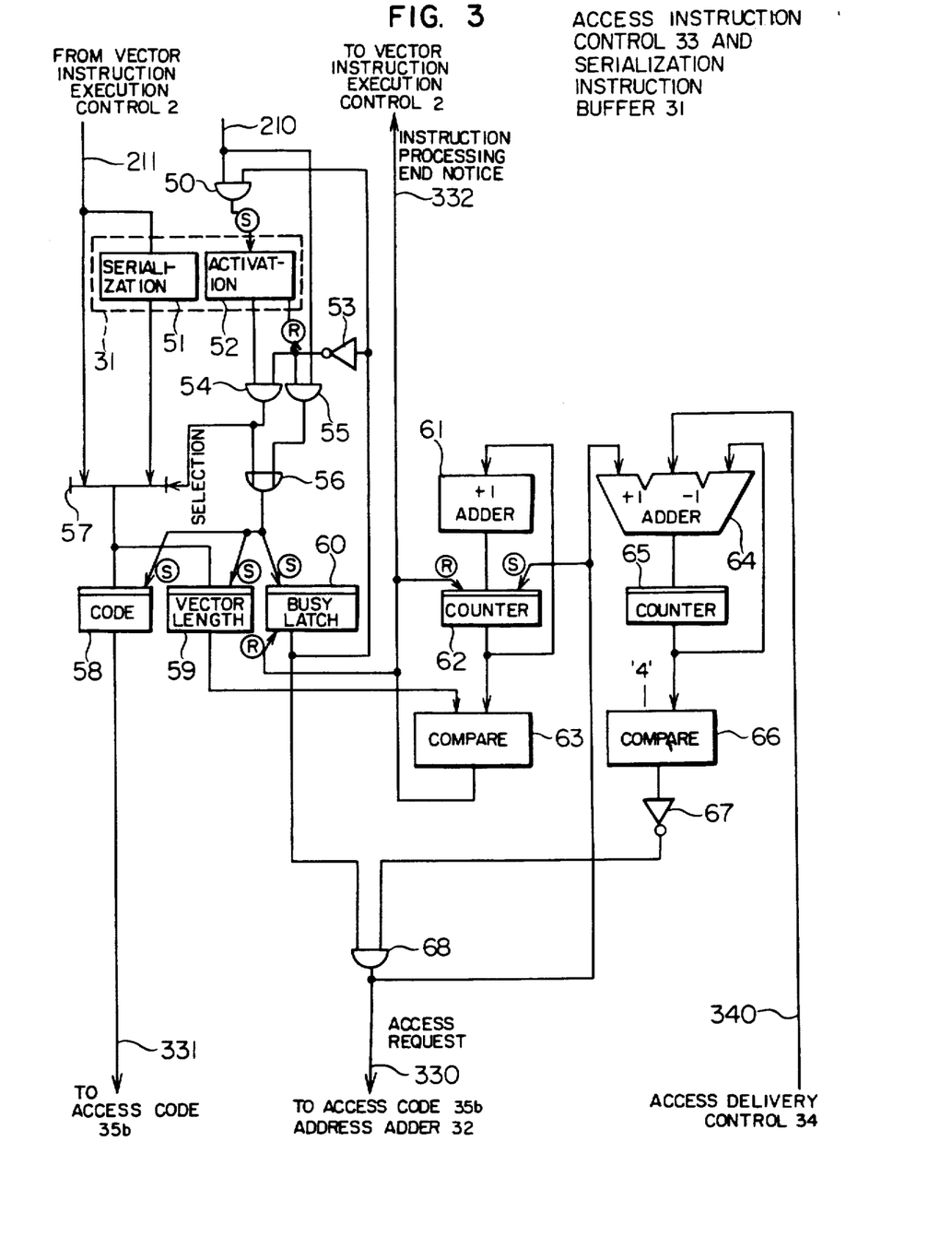
FIG. 3 is a block diagram showing an example of an access instruction control unit and a serialization instruction buffer.

FIG. 3 shows a detail of the access instruction control unit 33 and the serialization instruction buffer 31. An activation signal 210 sent from an instruction activation management unit 21 of the vector instruction execution control unit 2 sets a busy latch 60, for indicating that an access instruction is now under processing, via an AND gate 55 and an OR gate 56 unless the access instruction control unit 33 is not operated. Then, the code representative of the type of an access request and the vector length thereof accompanying the activation signal 210 are received on line 211 and set in registers 58 and 59, respectively. The value in the vector length register 59 is compared by a comparator 63 with the value of a counter 62, which counts the number of access requests or calculation instructions delivered on line 330 via an +1 adder 61. When both the values coincide with each other, i.e., when access requests corresponding in number to the designated vector length amount are delivered, an instruction processing end notice signal 332 is delivered to the vector instruction execution control unit 2 and the busy latch 60 is reset and the execution vector length value of the counter 62 is initialized to "0".

It is necessary to deliver an access request 330 while judging the status of processing access requests at the access instruction processing unit. Namely, the number of issued requests and the number of access requests delivered to the main storage control unit 8 are monitored so as not to cause overflow of the request buffer 39 at the last stage of the access instruction processing unit 3. The value of a buffer counter 65 is initially reset at "0". When an access request 330 is delivered, the count is incremented by +1 and set there at. A comparator 66 compares the value of the buffer counter 65 and the number of registers (four in this embodiment shown in FIG. 2) in the request buffer 39. When a coincidence is obtained, the delivery of an access request 330 is inhibited by an AND gate 68 via an inverter 67. When a signal 340, indicating that an access request has been delivered to the main storage control unit 8, is sent from the access request delivery control unit 34, the number of access requests is decremented by 1 by the adder 64.

If a serialization instruction is issued while the busy latch 60 is set, i.e., while an access instruction is being processed, an activation signal is set at a register 52 via an AND gate 50 and simultaneously therewith, the code of the serialization instruction is set at a register 51. After the busy latch 60 has been reset;. at the end of advancing access instructions, the busy latch 60 is again set via the OR gate 56 and an AND gate 54 opened by an inverter 53. At the same time, the content of the code register 51 is selected by the output of the AND gate 54 inputted to a selector 57 to which an output from the AND gate 54 is inputted, and set at the code register 58. "1" is set at the register 59 as the vector length of the serialization instruction. Simultaneously, when the serialization code and the activation signal are taken out from the registers 51 and 52, the register 52 is reset by an output signal from the inverter 53.

Figure 4:
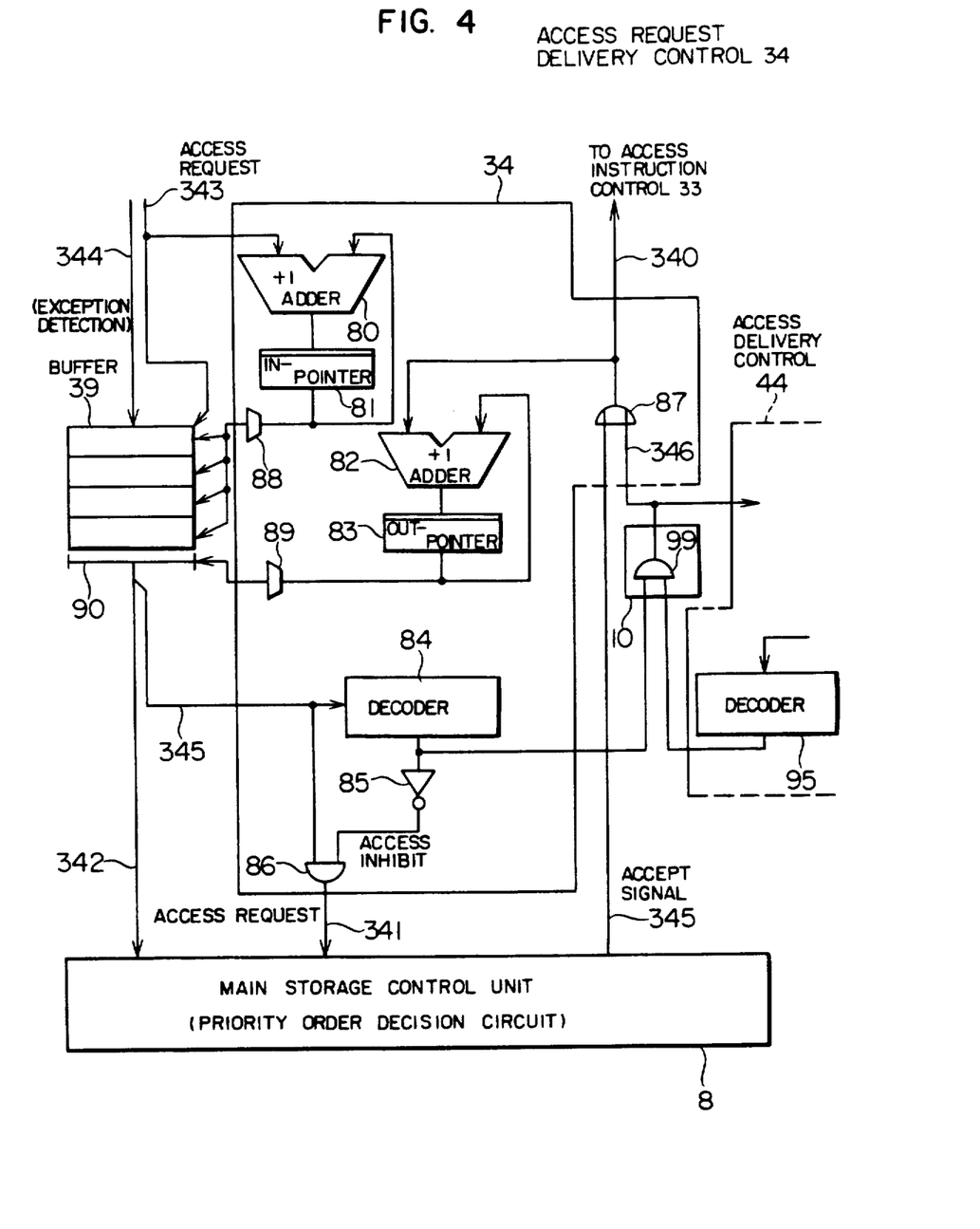
FIG. 4 is a block diagram showing an example of an access request delivery control unit and a serialization control unit.

FIG. 4 shows a detail of the access request delivery control unit 34 and the serialization unit 10, and a part of the access request delivery control unit 44. Of an access request 343 sent from the stage (3) in the access instruction processing unit 3, the corresponding code, address, data and the like are set at the request buffer 39. The buffer position is designated by a signal obtained by decoding the value in an in-pointer register 81 by a decoder 88, the value being incremented by +1 at an adder 80 every time an access request 343 is received. The in-pointer 81 takes a value of "0" to "3", "3" being followed by "0" in a lap-around manner. An access request including a set of the access code, address and data set at the request buffer 39 at the position designated by a signal obtained by decoding a value in an out-pointer register 83 by a decoder 89 is taken out via a selector 90. An access request taken from the request buffer 39, if not a serialization instruction, is delivered as an access request 341 to the main storage control unit 8 via an AND gate 86. Simultaneously therewith, the code, address and data 342 associated with the access request is sent to the main storage control unit 8 on line 342. The outputted access request 341 is not necessarily accepted by the main storage control unit 8 depending upon the status of the main storage or the contention with another access request. When a priority order is decided by a priority order decision circuit in the main storage control unit 8, an accept signal 345 of such effect is returned. Upon reception of this accept signal, the value of an out-pointer 83 is incremented by "+1" by the adder 82, and a signal 340 indicating that an access request has been processed once is indicated to the access instruction control circuit 33. The value of the out-pointer 83 takes "0" to "3" similarly to the in-pointer 81.

The code of an access request taken out from the request buffer 39 is decoded by a decoder 84 and if the decoded result shows that the access request is for a serialization instruction, the delivery of an access request from the AND gate 86 is inhibited by a signal from an inverter 85. Thus, the delivery of an access request from the access instruction processing unit 3 is stopped. A signal indicating that a serialization element has been detected is also sent to the serialization control circuit 10, i.e., to an AND gate 99. The delivery of the access request from the access instruction processing unit 3 is inhibited until a serialization element is detected by the decoder 95 in the access request delivery control unit of the access instruction processing unit 4. If a serialization element is detected by the decoder 95, a signal of such effect is sent to the serialization circuit 10 to open the AND gate 99 so that a signal 340 is outputted via the OR gate 87 indicating that a renewal of the out-pointer register 83 and the processing of one access request have been completed. Thus, the delivery of an access request from the access instruction processing unit 3 heretofore stopped starts again. The access instruction processing unit 4 performs a similar operation to the above.

The structure and the brief operation of the access instruction processing unit shown in FIG. 2 have been described. Next, the process flow of the access instruction processing unit will be described taking a series of vector instructions as an example.

FIGS. 5A to 5E show a series of vector instructions used in the following description, and the sequential status of each element of a vector instruction at stages (1) to (4) in the access instruction processing unit. The stage (4) is represented by four first-in and first-out buffers.

Figure 5A:
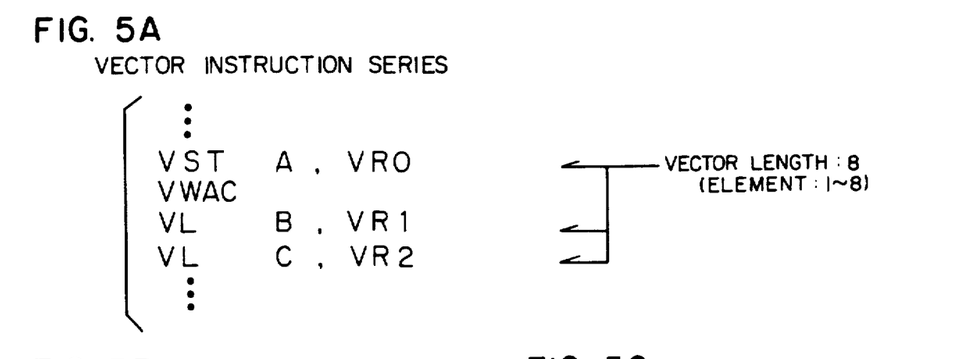
FIGS. 5A to 5E show a series of vector instructions and a status of processed instruction in the access instruction processing unit, for explaining the operation of the embodiment.

In the series of vector instructions, a VST instruction is an instruction for writing data of a vector register "VR0" into a region "A" in the main storage, a VWAC instruction is an instruction for serializing instructions after and before this instruction, and a VL instruction is an instruction for fetching data in a region "B" or "C" from the main storage to a vector register "VR1" or "VR2". It is assumed that the vector length of respective VST and VL instructions is 8 (element number 1 to 8). In the diagrams showing the process status, the number in the parentheses indicates the element number processed at each instruction. The mnemonic in each block represents the following instruction:

VST ... VST A, VR0

VL(B) ... VL B, VR1

VL(C) ... VL C, VR2

The designation of respective regions A, B and C is obtained by a combination of start address A0, B0, C0 and address increments Al, Bl, Cl (e.g., VST A0, Al, VR0).

In the vector instruction execution control unit 2, when a first instruction "VST A, VR0" is set at the instruction register 20, the instruction activation management unit 21 decodes the instruction to issue it to the access instruction processing unit 3 based on the status of the status management unit 22. When a next instruction "VWAC" is set at the instruction register 20 and decoded, the instruction activation management unit 21 issues the instruction to both the access instruction processing units 3 and 4. Since the access instruction processing unit 3 is executing the advancing instruction "VST A, VR0", the instruction "VWAC" is set at the serialization instruction buffer 31. After an access request of the advancing instruction has been completed, the instruction "VWAC" is moved from the buffer 31 to the access instruction control unit 33 and processed there at. When a succeeding instruction "VL B, VR1" is decoded by the instruction activation management unit 21 of the vector instruction execution control unit 2, the unit 21 issues the instruction to the access instruction processing unit 4 after the instruction "VWAC" has been processed by the access instruction control unit 43 of the access instruction processing unit 4. A next succeeding instruction "VL C, VR2" decoded by the instruction activation management unit 21 is not issued because both the access instruction processing units 3 and 4 cannot receive ordinary instructions at that time. A series of vector instructions VL, VWAC and VST reversed in order to that of the vector series shown in FIG. 5A would be processed in a similar manner.

Figure 5B:
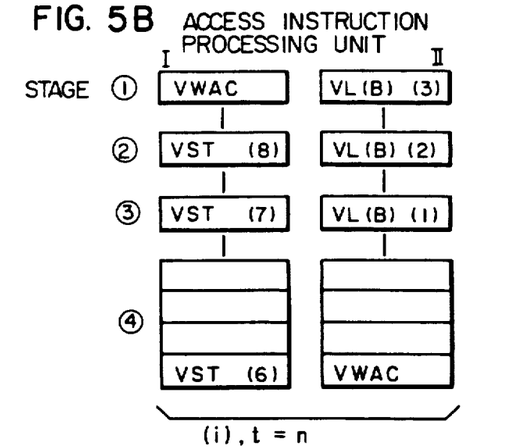

The status (I) shown in FIG. 5B indicates that the above three instructions have been issued and the element of the instruction "VWAC" is present at stage (1) in the access instruction processing unit I. The time at this status is represented by t = n. At this time instance, the access instruction processing unit I is allowed to receive a next access instruction so that the instruction activation management unit 2 of the vector instruction execution control unit 2 issues the held instruction "VL C, VR2" to the access instruction processing unit I.

Figure 5C:
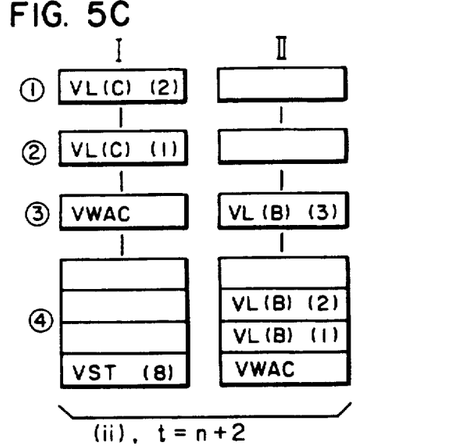

The status (II) shown in FIG. 5C represents the status two machine cycles after the status (I). Since the element of the instruction "VWAC" is present at the outlet of the stage (4) of the access request buffer 44, the access instruction processing unit II is caused to inhibit the delivery of an access request, thus holding the access requests in the buffer. The access instruction control unit 43 never outputs access requests in excess of four, so that the fourth element of the access request for the instruction "VL B, VR1" is still not outputted, thereby making the stages (1) and (2) empty.

Figure 5D:
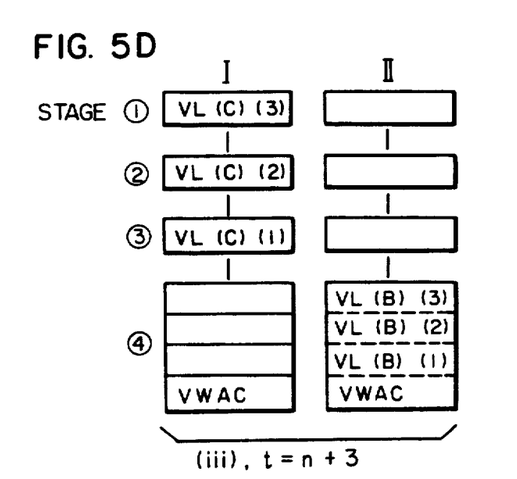

The status (III) shown in FIG. 5D represents the status one machine cycle after the status (II). Both the access instruction processing units I and II have the instruction element of "VWAC" at the outlets of the access request buffers. This status is detected by the serialization circuit 10 to increment the out-pointers of both the access control units 34 and 44 by one.

Figure 5E:
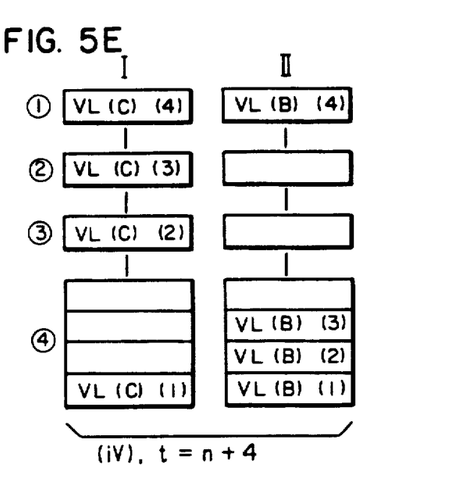

The status (IV) shown in FIG. 5E represents the status one machine cycle after the status (III). Both the instruction elements "VWAC" are taken out from both the access request buffers 39 and 49 at the same time so that access request elements of the instructions after the serialization instruction are allowed to be delivered.

As described above, the access requests of access instructions after the instruction "VWAC" are caused to be inhibited until all the elements of instructions issued before the instruction "VWAC", thus enabling a serialization of the instruction "VWAC".

What is claimed is:

1. A vector processor for pipelining vector data including a storage unit, a storage control unit for controlling said storage unit, a plurality of access instruction pipelines having a plurality of stages connected to said storage control unit of pipelining access instructions, a vector register connected between said storage unit and said access instruction pipelines, an a vector instruction execution control unit connected to said plurality of access instruction pipelines for distributing an access instruction and a serialization instruction for serializing said access instruction to said access instruction pipelines, wherein each access instruction pipeline of said vector processor comprises:
(a) a stage for calculating an address of an instruction inputted from said vector instruction execution control units;
(b) a plurality of request buffers coupled to an output of said calculating stage and including stages which sequentially hold access requests to be sent to said storage control unit in accordance with said inputted instruction;
(c) detection means connected to said plurality of request buffers for detecting if an access request sent to said storage control unit is said serialization instruction or not;
(d) AND means for receiving all outputs from said detection means in said plurality of access instruction pipelines and generating a logical AND of said outputs so as to detect said serialization instruction at a stage within each of said access instruction pipelines.
(e) means for inhibiting the sending of an access request from said access instruction pipelines to said storage control unit based on a result of detection from said detection means; and
(f) access request start means for sending the contents of said plurality of buffers of said plurality of access instruction pipelines to a next stage therein based on an output from said AND means.

2. A vector processor according to claim 1, wherein said inhibiting means comprises:
means for decoding an access request outputted from said plurality of request buffers; and
a gate circuit connected to said code means for disabling an access request delivered form said last stage in response to an access instruction to said storage control unit based on an output from said decode means.

3. A vector processor according to claim 2, wherein, while the delivery of an access request is inhibited based on the result of detection from said detection means, a said access request is allowed to flow in each stage before the last of said plurality of buffers of said access instruction pipeline.

4. A vector processor comprising:
(a) a plurality of arithmetic pipelines for performing a vector arithmetic operation inparallel;
(b) a storage unit for storing data;
(c) a vector register connected between said of arithmetic pipelines and said storage unit;
(d) a storage control unit connected between said storage unit and said vector register for controlling data transfer therebetween;

(e) a plurality of access instruction processing pipelines connected to said storage control for processing access instructions to be used for access to said memory and said vector register; and (f) an instruction execution control unit connected to said plurality of access instruction processing pipelines for selectively sending a vector store, a vector load or a serialization instruction to said access instruction processing pipelines;

each of said plurality of access instruction processing pipelines comprising;

(i) an access instruction control for sequentially inputting a vector store instruction, a vector load instruction and a serialization instruction to said access instruction processing pipeline;

(ii) a serialization instruction buffer for buffering said serialization instruction received from said instruction execution control unit while said access instruction control is full of preceding instructions and can not accept a serialization instruction from said instruction execution control unit;

(iii) an address adder for calculating an access address of said vector store to load instruction;

(iv) a plurality of buffers for receiving an output from said address adder and buffering said output for sequential delivery of said output as a memory request to said storage control unit;

(v) an access delivery control unit connected to said plurality of buffers at a stage for receiving outputs from said plurality of buffers and detecting said serialization instruction arrived at said stage of said plurality of buffers;

(vi) access request inhibition means responsive to an output from said access delivery control unit for inhibiting said instruction processing pipeline at said plurality of buffers and responsive to said access delivery control units each receiving a serialization instruction from said instruction execution control unit for allowing said plurality of instruction processing pipelines to operate; and wherein said access instruction processing pipelines include means for providing said storage control unit with access requests responding to said access instructions, said storage control unit including means for retuning accept signals responding to said access requests to said access instruction processing pipeline, and each of said access instruction processing pipelines comprises:

means or holding the number of said plurality of buffers;

means for calculating the number of access requests sent to said storage control unit and the number of accept signals sent from said storage control unit;

means for comparing the output values of said holding means and said calculating means; and means for inhibiting the flow of access instructions to said plurality of buffers in said access instruction processing pipelines based on the output from said comparison means.

5. A vector processor comprising:

(a) a plurality of arithmetic pipelines for performing a vector arithmetic operation inparallel;

(b) a storage unit for storing data;

(c) a vector register connected between said plurality of arithmetic pipelines and said storage unit;

(d) a storage control unit connected between said storage unit and said vector register for controlling data transfer therebetween; and (e) a plurality of access instruction processing pipelines connected to said storage control for processing access instructions to be executed by said plurality of arithmetic pipelines;

each of said plurality of access instruction processing pipelines comprising:

(i) an access instruction control for sequentially inputting a vector store instruction, a vector load instruction and a serialization instruction to said access instruction processing pipeline;

(ii) an address adder to calculating an access address of said vector store or load instruction;

(iii) a plurality of buffers for receiving an output from said address adder and buffering said output for sequential delivery of said output as a memory request to said storage control unit;

(iv) an access delivery control unit for receiving outputs from said plurality of buffers and detecting said serialization instruction;

(v) access request inhibition means responsive to an output from said access delivery control unit for inhibiting said instruction processing pipeline at said plurality of buffers; and wherein said vector processor comprises an instruction execution control unit connected to said plurality of access instruction processing pipelines for selectively inputting access instructions to said access instruction processing pipeline, said access instruction processing pipeline including means for providing said storage control unit with access requests responding to said access instructions, said storage control unit including means for returning accept signals responding to said access requests to said access instruction processing pipeline, and each of said access instruction processing pipelines comprises:

means for holding the number of said plurality of buffers;

means for calculating the number of access requests sent to said storage control unit and the number of accept signals sent from said storage control unit;

means for comparing the output values of said holding means and said calculating means; and means for inhibiting the flow of access instructions to said plurality of buffers in said access instruction processing pipelines based on the output from said comparing means.

* * * * *